Nov. 7, 1944.  C. A. MARTIN  2,362,389
FLUID TRANSMISSION AND DRIVE
Filed Nov. 12, 1941  4 Sheets-Sheet 1
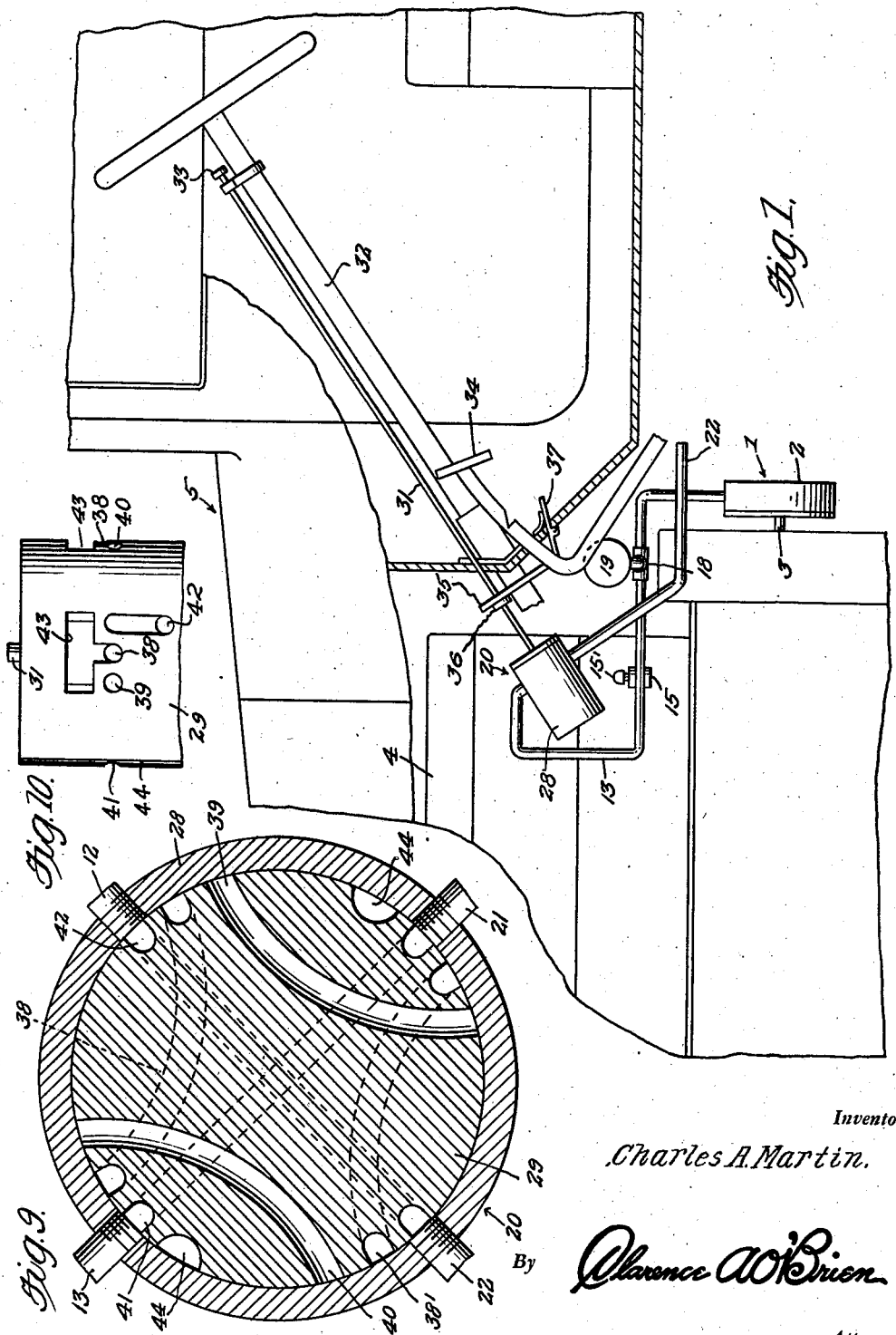
Inventor
Charles A. Martin.
By Clarence A. O'Brien
Attorney Nov. 7, 1944.   C. A. MARTIN   2,362,389
FLUID TRANSMISSION AND DRIVE
Filed Nov. 12, 1941   4 Sheets-Sheet 2
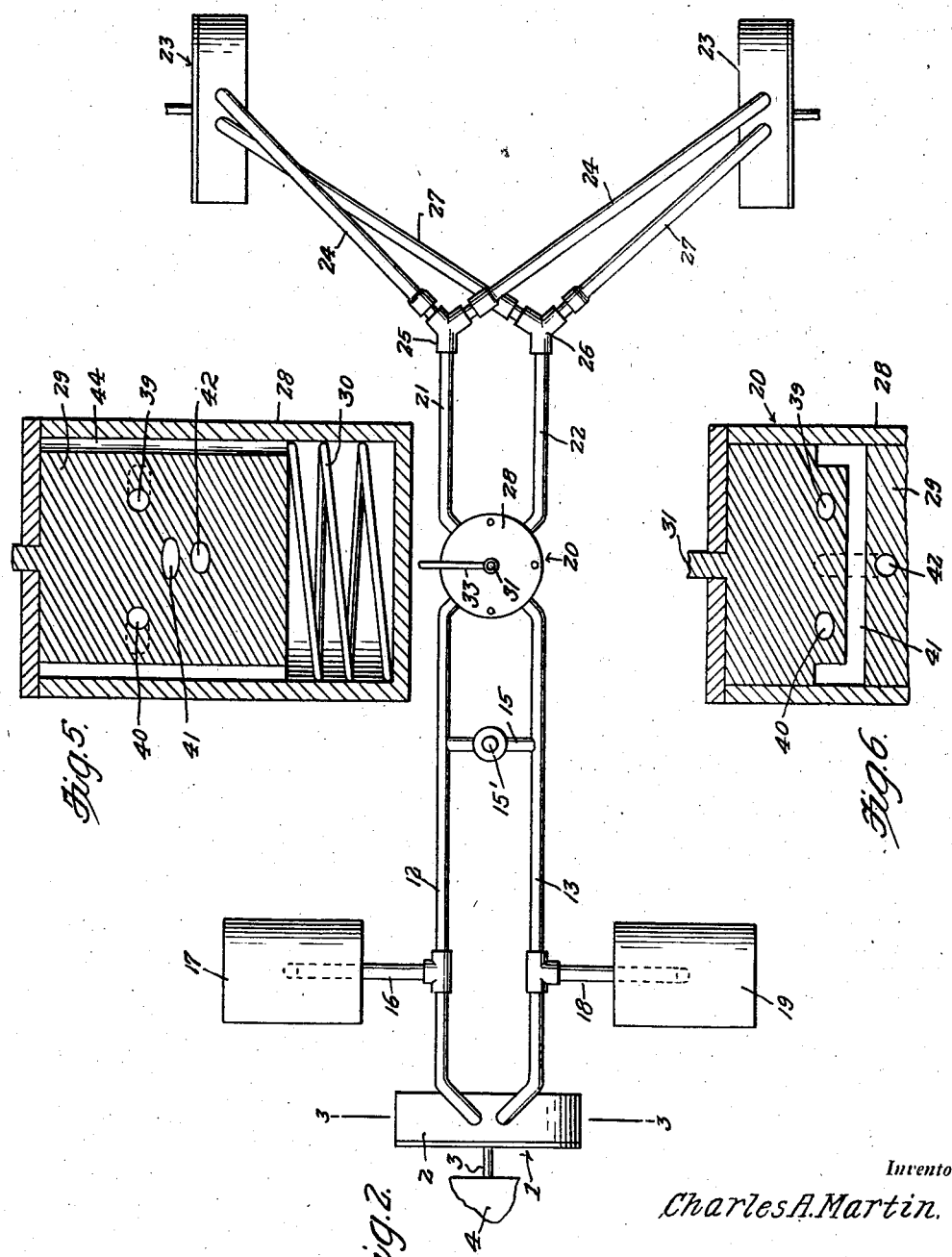
Inventor
Charles A. Martin.
By Clarence A. O'Brien
Attorney Nov. 7, 1944.   C. A. MARTIN   2,362,389
FLUID TRANSMISSION AND DRIVE
Filed Nov. 12, 1941   4 Sheets-Sheet 3
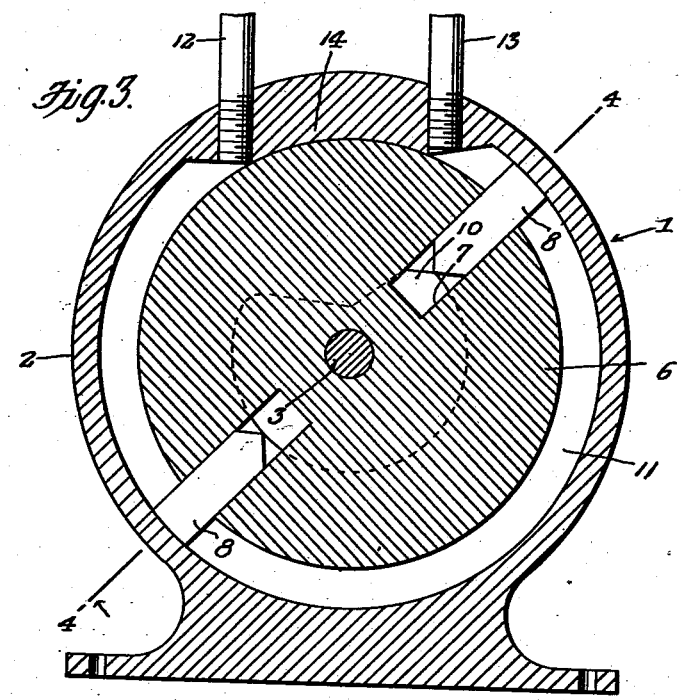
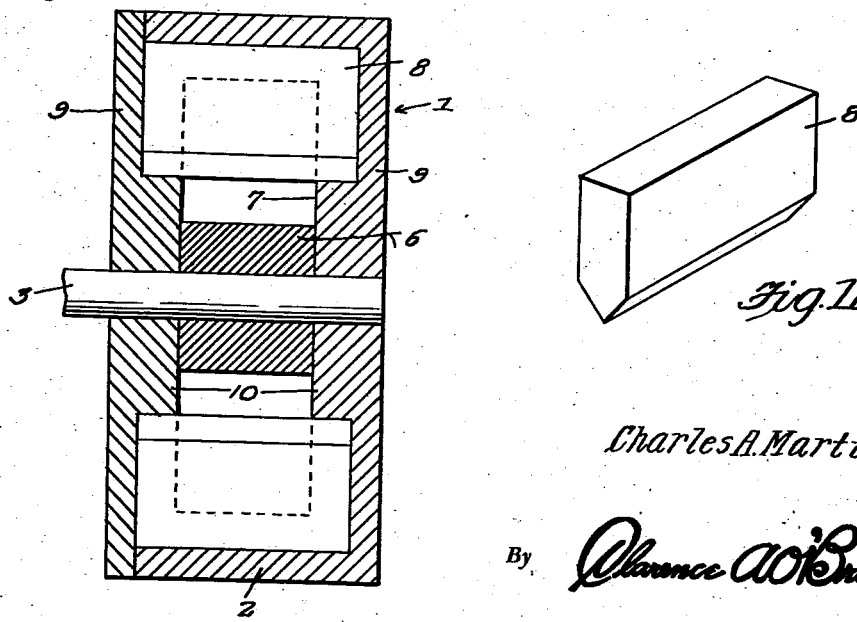
Inventor
Charles A. Martin,
By Clarence A. O'Brien
Attorney Nov. 7, 1944.   C. A. MARTIN   2,362,389
FLUID TRANSMISSION AND DRIVE
Filed Nov. 12, 1941   4 Sheets-Sheet 4

Inventor
Charles A. Martin,
By Clarence A. O'Brien
Attorney

Patented Nov. 7, 1944

2,362,389

UNITED STATES PATENT OFFICE 2,362,389

FLUID TRANSMISSION AND DRIVE

Charles A. Martin, Tupelo, Miss., assignor of one-half to Agrippa Kellum Long, Tupelo, Miss.

Application November 12, 1941, Serial No. 418,837

1 Claim. (Cl. 60—53)

This invention pertains to new and useful improvements in fluid transmissions and drives particularly for motor vehicles, although it will be understood, of course, that the apparatus may be used for any other purpose for which it may be found adapted and desirable.

The primary object of the present invention is to provide, in a manner as hereinafter set forth, an apparatus of the aforementioned character comprising novel means for propelling motor vehicles and other devices without the use of the usual differential, gear transmission, et cetera.

Another very important object of the invention is to provide an apparatus of the character described which, in addition to propelling the vehicle forwardly or in reverse, is also adapted to brake said vehicle.

Still another very important object of the invention is to provide a fluid transmission and drive of the character set forth which is adapted to be conveniently controlled by the operator of the vehicle through the medium of a single manually operable valve.

Other objects of the invention are to provide a fluid transmission and drive which will be comparatively simple in construction, strong, durable, highly efficient and reliable in use, compact and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of the forward portion of the apparatus installed in a motor vehicle.

Figure 2 is a diagrammatic view of the fluid system.

Figure 3 is a cross-sectional view through the rotary reversible fluid pump, taken substantially on the line 3—3 of Figure 2.

Figure 4 is a view in longitudinal section through the pump, taken substantially on the line 4—4 of Figure 3.

Figure 5 is a view in vertical section through the control valve, taken substantially on the line 5—5 of Figure 7.

Figure 6 is a vertical sectional view through an upper portion of the valve, taken substantially on the line 6—6 of Figure 8.

Figure 9 is a view in horizontal section, showing the valve in reverse position.

Figure 10 is a detail view in elevation of the upper portion of the rotary and slidable valve core.

Figure 11 is a detail view in perspective of one of the pump vanes.

Figure 8:
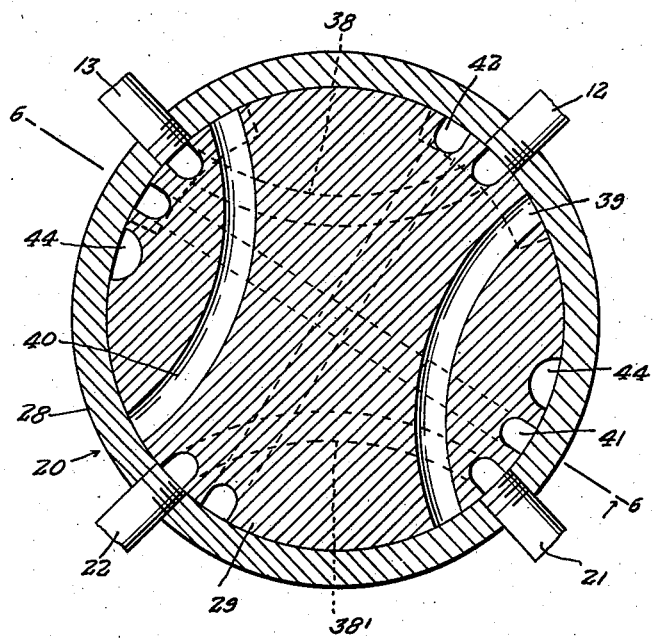
Figure 8 is a horizontal sectional view, showing the valve in neutral position.

Referring now to the drawings in detail, it will be seen that the embodiment of the invention which has been illustrated comprises a suitable rotary, reversible fluid pump which is designated generally by reference numeral 1. The pump 1 includes a housing 2 having journaled therein the rear end portion of the crank shaft 3 of the engine 4 of a motor vehicle 5.

Fixed on the crank shaft 3 for operation in the housing 2 is a rotor 6. The rotor 6 has formed therein radial pockets 7. Vanes 8 are slidable in the pockets 7. The vanes 8 travel on the inner circumferential wall of the housing 2. Toward this end, the inner faces of the side walls 9 of the housing 2 have formed thereon cams 10 on which the vanes 8 ride.

The periphery of the rotor 6 is spaced from the inner circumferential wall of the housing 2 thereby providing a chamber 11. Formed in the upper portion of the housing 2 is an abutment 14. Fluid conducting pipes 12 and 13 communicate with the chamber 11 on opposite sides of the abutment 14.

A pipe 15 connects the pipes 12 and 13, said pipe 15 having interposed therein a safety valve 15'. Connected by a pipe 16 to the pipe 12 is an air compressing chamber 17. Connected by a pipe 18 to the pipe 13 is a fluid reservoir and suction chamber 19. The chambers 17 and 19 are connected to the pipes 12 and 13 at points between the pipe 15 and the pump 1.

The other ends of the pipes 12 and 13 are connected to a control valve 20. Also connected, at one end, to the control valve 20 are pipes 21 and 22. Reference character 23 designates a pair of rotors or motors for driving the rear wheels of the vehicle, which rotors are similar in construction to the pump 1. If desired, these rotors may also be provided for the front wheels of the vehicle. Branches 24 have one end connected to the pipe 21 by a flexible three-way coupling 25.

A similar coupling 26 connects branches 27 to one end of the pipe 22. The other ends of the branches 24 are connected to one side of the rotors 23 and the other ends of the branches 27 are connected to the other side of said rotors.

The valve 20 includes a cylindrical casing 28 to the periphery of which the pipes 12, 13, 21 and 22 are threadedly connected at points 90° apart. Rotatably and slidably mounted in the casing 28 is a plug or core 29. A coil spring 30 (see Fig. 5) yieldingly urges the core 29 upwardly in the casing 28. The core 29 is fixed on the lower end of an operating shaft 31 which is rotatably and slidably mounted on the steering column 32 of the vehicle. A hand lever 33 is provided on the upper end portion of the shaft 31. Any suitable means may be provided for indicating the position of the lever 33.

A brake pedal on the vehicle 5 is indicated at 34. Projecting from the brake pedal 34 is a fork or the like 35 which is engageable with a collar 36 on the shaft 31 for forcing the core 29 downwardly against the tension of the coil spring 30 when the brake pedal is depressed. A suitable latch 37 releasably secures the brake pedal 34 in depressed position.

The core 29 has formed therein for communication with the pipes 12, 13, 21 and 22 a plurality of fluid passages 38, 38', 39, 40, 41 and 42. Formed circumferentially in the core 29 above the forward ends of the passages 39, 40, 41 and 42, and communicating with both ends of the passage 38, are grooves or channels 43. It may be well to here state that the grooves or channels 43 maintain communication between the pipes 12 and 13 through the passage 38 when the core 29 is in lowered position regardless of the position to which said core may have been rotatably adjusted. Longitudinal grooves or channels 44 are provided in the core 29 for the passage of fluid from one end of said core to the other in the housing 28 when said core is reciprocated therein.

Figure 7:
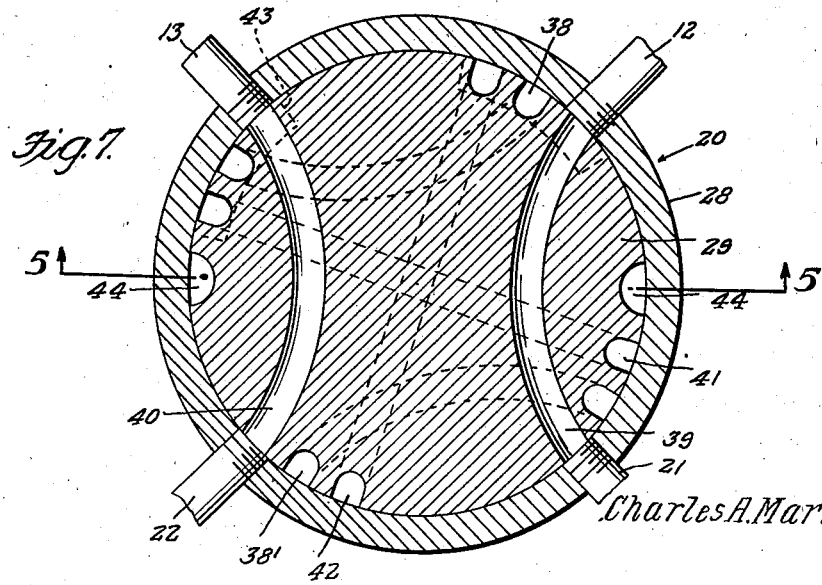
Figure 7 is a view in horizontal section through the control valve, showing said valve in forward position.

It is thought that the operation of the apparatus will be readily apparent from a consideration of the foregoing. Briefly, with the valve 20 in forward position, as seen in Figure 7 of the drawings, and with the pump 1 in operation, fluid from said pump flows through the pipe 12, the passage 39 in said valve, the pipe 21, the coupling 25 and the branches 24 into the rotors 23 which are actuated by said fluid for propelling the vehicle forwardly. Returning, the fluid flows from the rotors 23 through the branches 27 and the coupling 26 to the pipe 22, then through the passage 40 of the valve 20 and the pipe 13 to the pump 1. When reverse is desired, the valve 20 is adjusted to the position seen in Figure 9 of the drawings thereby connecting the pipes 12 and 22 through the passage 42 and the pipes 13 and 21 through the passage 41. When this is done, the fluid from the pump 1 circulates in the reverse direction through the rotors 23. With the valve 20 in neutral position, as seen in Figure 8 of the drawings, the pipes 12 and 13 communicate through the passage 38 and pipes 21 and 22 communicate through the passage 38'. The entire system is filled with a suitable fluid, with the exception of the chamber 17. Fluid from the reservoir 19 and the pump 1 enters the chamber 17 and compresses the air therein. When the load becomes heavier than usual, this air pressure builds up and assists in propelling the fluid through the rotors 23. As the fluid is drawn from the reservoir 19 a partial vacuum is created therein which assists in pulling the fluid through the rotors 23 for propelling the vehicle. However, if the load is too great, the safety valve 15' automatically opens and the fluid returns to the pump 1 through the connection 15 and the pipe 13. By swinging the lever 33 from neutral toward either forward or reverse position, the control valve 20 may be so adjusted that a portion of the fluid will continue to circulate through the neutral passages of the system while the rest of said fluid will be directed through the rotors 23 for driving same. Thus, the vehicle 5 may be propelled at low speed but with a proportionately greater engine speed, thereby increasing the power of said engine for hard pulls. When it is desired to brake the vehicle, the pedal 34 is depressed thereby forcing the core 29 downwardly against the tension of the coil spring 30. When this is done, and regardless of the position to which the core 29 has been rotatably adjusted through the medium of the lever 33, communication between the pipes 21 and 22 is restricted or broken and communication is established or maintained between the pipes 12 and 13 through the circumferential grooves or channels 43 and the passage 38 in the valve core 29. Thus, the fluid from the pump 1 circulates through the pipe 12 and the valve 20 and returns to said pump through the pipe 13. However, the circulation of the fluid through the rotors 23 is restricted or prevented.

It is believed that the many advantages of a fluid transmission and drive constructed in accordance with the present invention will be readily understood, and although a preferred embodiment of the apparatus is as illustrated and described, it is to be understood that changes in the details of construction and in the combination and arrangement of parts may be resorted to which will fall within the scope of the invention as claimed.

What is claimed is:

In a fluid transmission of the type including a pump, pipes connected to opposite sides of the pump, a rotor, and pipes connected to opposite sides of said rotor, a multiway valve, said pipes connected to the valve, said valve comprising a cylindrical casing, a core mounted for rotating and reciprocating adjustment in the casing, said core, upon rotary adjustment thereof, comprising means for selectively connecting the first and second-named pipes and further comprising, upon reciprocatory adjustment thereof, means for disconnecting said first and second-named pipes and connecting said first-named pipes, said core being movable to its slidably adjusted position directly from any of its rotatably adjusted positions, a coil spring in the casing for returning the core to its rotatably adjusted positions, a shaft connected to the core for rotating same, and a foot pedal operatively connected to the shaft for actuating the core against the tension of the spring.

CHARLES A. MARTIN.